United States Patent [19]

Hintze-Brüning et al.

[11] Patent Number: 5,374,691
[45] Date of Patent: Dec. 20, 1994

[54] AQUEOUS COATING COMPOSITION, IN PARTICULAR FOR THE COATING OF FINISH SHEETING AND CONTINUOUS EDGING, AS WELL AS A PROCESS FOR THE COATING OF FINISH SHEETING AND CONTINUOUS EDGING

[75] Inventors: Horst Hintze-Brüning; Joachim Roll, both of Münster, Germany

[73] Assignee: BASF Lacke + Farben Aktiengesellschaft, Munster, Germany

[21] Appl. No.: 915,805

[22] PCT Filed: Jan. 16, 1992

[86] PCT No.: PCT/EP91/00059

§ 371 Date: Aug. 7, 1992

§ 102(e) Date: Aug. 7, 1992

[87] PCT Pub. No.: WO91/10713

PCT Pub. Date: Jul. 25, 1991

[30] Foreign Application Priority Data

Jan. 22, 1990 [DE] Germany ............... 4001672

[51] Int. Cl.$^5$ ............... C08F 20/00; C08L 61/00
[52] U.S. Cl. ............... 525/443; 525/444;
525/519; 525/939; 524/590; 524/591; 524/602;
524/607; 524/608; 524/539; 427/385.5;
428/482
[58] Field of Search ............... 524/539, 589, 591, 598,
524/559, 602, 608, 906; 525/443, 162, 444, 509,
519, 939; 427/388.3, 388.4; 428/480, 482;
528/259

[56] References Cited

U.S. PATENT DOCUMENTS

| | | | |
|---|---|---|---|
| 3,223,659 | 12/1965 | Curtice et al. | 525/519 |
| 4,071,578 | 1/1978 | Lasher | 427/388.3 |
| 4,123,404 | 10/1978 | Lasher | 525/443 |
| 4,281,068 | 7/1981 | Frank et al. | 525/444 |
| 4,424,296 | 1/1984 | Antonelli | 524/539 |
| 4,430,368 | 2/1984 | Garland et al. | 427/385.5 |
| 4,535,031 | 8/1985 | Dorries et al. | 428/481 |
| 4,608,405 | 8/1986 | DeGooyer | 523/404 |
| 4,612,338 | 9/1986 | Chung et al. | 523/414 |

FOREIGN PATENT DOCUMENTS 0083016 7/1983 European Pat. Off.
2711001 9/1978 Germany.

*Primary Examiner*—Tae H. Yoon
*Attorney, Agent, or Firm*—Anne G. Sabourin

[57] ABSTRACT

The present invention relates to acid-curing aqueous coating compositions, in particular for the coating of finish sheeting and continuous edging, which contain aminoplast resin and hydroxyl-containing polyesters, wherein the polyester is prepared from a) 33 to 55 mol % of a dicarboxylic acid component obtained from
  $a_1$) 50 to 100 mol % of olefinically unsaturated aliphatic dicarboxylic acids
  $a_2$) 0 to 50 mol % of saturated aliphatic dicarboxylic acids
  $a_3$) 0 to 50 mol % of saturated aliphatic dicarboxylic acids and
b) 67 to 45 mol % of a polyol component obtained from
  $b_1$) 20 to 90 mol % of at least one monomeric and/or oligomeric glycol having 2 to 4 carbon atoms per glycol segment and number average molecular weights smaller than 200
  $b_2$) 5 to 30 mol % of at least one polymeric glycol having 2 to 4 carbon atoms per glycol segment and a number average molecular weight between 300 and 1000 and
  $b_3$) 0 to 70 mol % of at least one polyol having 2 to 4 OH groups and 4 to 10 carbon atoms per molecule, except the glycols used as component $b_1$.

13 Claims, No Drawings

AQUEOUS COATING COMPOSITION, IN PARTICULAR FOR THE COATING OF FINISH SHEETING AND CONTINUOUS EDGING, AS WELL AS A PROCESS FOR THE COATING OF FINISH SHEETING AND CONTINUOUS EDGING

The present invention relates to aqueous coating compositions, in particular for the coating of finish sheeting and continuous edging, which comprise a varnish component I containing A) 15 to 70% by weight, preferably 30 to 55% by weight, based on the total weight of the varnish component I, of one or more water-thinnable melamine and/or urea resins B) 10 to 40% by weight, preferably 15 to 25% by weight, based on the total weight of the varnish component I, of one or more hydroxyl-containing polyesters and, c) if appropriate, pigments and/or fillers as well as, if appropriate, customary auxiliaries and additives and, D) if appropriate, thinners, comprising at least 50% by weight of water and, if appropriate, organic solvents, and a varnish component II containing 0.5 to 50% by weight, based on the total weight of the components A to C, of an acidic curing catalyst.

In addition, the subject matter of the invention is a process for the coating of finish sheeting and continuous edging using these aqueous coating compositions.

Impregnated paper sheets which represents a pretreatment in the sense of a primer (primer sheeting) when pressure-applied to board or which frequently display a decorative effect (decorative sheeting) have been used for a considerable time in the furniture and board industry. After being pressure-applied to chipboard or hardboard, the sheeting must receive a coating of varnish. This additional operation becomes redundant with the use of finish sheeting which is already varnished by the sheeting manufacturer following impregnation. The finish sheeting and continuous edging (for continuous edge coating) obtained in this manner are supplied to the furniture and board industry in rolls; they are then glued to substrates such as, for example, chipboard or hardboard, under the action of heat and/or pressure. Surfaces are thus obtained which usually do not require a further coat of varnish, i.e. they can be processed further 'straight from the press'. Varnishes which are suitable for this process are described, for example, in DE-A 2,316,158.

The development of special water-repellent pore printing inks also provides finish sheeting with a three-dimensional pore structure which represents an excellent imitation of wood veneer (cf., for example, DE-A 3,247,677, U.S. Pat. No. 3,811,915 and DE-A 3,024,391). This sheeting is usually also processed further without an additional coat of varnish.

In order to improve the appearance of certain surfaces which are subject to particularly high quality demands such as, for example, cupboard fronts, and/or to make good any damage to the coating of varnish which occurred during transport, such finish sheeting and continuous edging may receive a further partial coat of varnish. The varnishes used for this further coat are conventional wood finishes, for example acid-curing varnishes and varnishes based on polyurethanes, unsaturated polyester resins and nitrocellulose.

Adhesion of these varnishes to the finish sheeting has been achieved in the past either by mechanical pretreatment (grinding) of the varnished surfaces or by coating the decorative sheeting with special water-thinnable coating compounds which, when dry and pressure-applied, can be further coated without pretreatment.

Coating compounds which can be overcoated after appropriate pretreatment or by the addition of plasticizers, are described, for example, in DE-A 2,316,158.

Such special coating compounds contain a high proportion, 10 to 35% by weight based on the total weight of the coating compound, of plasticizers, without which there is no adequate adhesion of the wood finishes to the sheeting.

The object of the present invention is therefore to provide aqueous coating compositions for the coating of finish sheeting, continuous edging and wood materials which result in coatings with good application properties such as, for example, good scratch resistance, good chemical resistance and good resistance to graying even without a further coating. In particular these varnishes should be well capable of being further coated even with conventional varnishes and should promote good adhesion of this conventional varnish film to the coating under discussion. Finally, they should be capable of drying with low emission, i.e. no further organic substances such as, for example, volatile plasticizers should be emitted under the drying conditions which are customary in practice, except for condensation cleavage products liberated during crosslinking.

Surprisingly, this object is achieved by aqueous coating compositions which comprise a varnish component I containing A) 15 to 70% by weight, preferably 30 to 55% by weight, based on the total weight of the varnish component I, of one or more water-thinnable melamine and/or urea resins B) 10 to 40% by weight, preferably 15 to 25% by weight, based on the total weight of the varnish component I, of one or more hydroxyl-containing polyesters and, C) if appropriate, pigments and/or fillers as well as, if appropriate, customary auxiliaries and additives and D) if appropriate, thinners, comprising at least 50% by weight of water and, if appropriate, organic solvents, and a varnish component II containing 0.5 to 50% by weight, based on the total weight of the components A to C, of an acidic curing catalyst. The coating compositions are those in which the polyesters used as component B have been prepared from a) 33 to 55 mol % of dicarboxylic acids and b) 67 to 45 mol % of diols and/or polyols, the dicarboxylic acid component a being a mixture of $a_1$) 50 to 100 mol % of at least one olefinically unsaturated aliphatic dicarboxylic acid $a_2$) 0 to 50 mol % of at least one saturated aliphatic dicarboxylic acid and $a_3$) 0 to 50 mol % of at least one aromatic dicarboxylic acid and the diol and/or polyol component b being a mixture of $b_1$) 20 to 90 mol % of at least one monomeric and/or oligomeric glycol having 2 to 4 carbon atoms per glycol segment and a number average molecular weight less than 200

$b_2$) 5 to 30 mol % of at least one polymeric glycol having 2 to 4 carbon atoms per glycol segment and a number
average molecular weight between 300 and 1000 and
$b_3$) 0 to 70 mol % of at least one polyol having 2 to 4 OH groups and 4 to 10 carbon atoms per molecule, except the glycols used as component $b_1$,
with the proviso that the total of the amounts of the components $a_1$ to $a_3$ as well as the total of the amounts of the components $b_1$ to $b_3$ as well as the total of the amounts of the components a and b are in each individual case 100 mol %.

The invention further relates to the coating of finish sheeting and continuous edging using these aqueous coating compositions, as well as to the finish sheeting and continuous edging obtained by this process and to their use for gluing to chipboard and hardboard.

In the text below the individual components of the aqueous coating compositions are first elucidated in greater detail.

The melamine resins (component A) used in the varnish component I are generally known, usually etherified melamine-aldehyde reaction products, preferably melamine-formaldehyde reaction products. The water thinnability of the melamine resins depends on the etherification component, apart from the degree of condensation which should be as low as possible, only the lowest members of the alkanol series producing water-soluble condensates. The most significant are the hexamethoxymethylmelamine resins. Butanol-etherified melamine resins can also be dispersed in the aqueous phase, if solubilizers are used.

Examples of suitable melamine resins are the water-soluble melamine resins available commercially under the brand names Cymel ® 300, 301, 303 (manufactured by Dyno Cyanamid, Düsseldorf), Luwipal ® 068, 066, LR 8789, (manufactured by BASF AG, Ludwigshafen), Beetle ® BE 3745 and BE 370 (manufactured by BIP Chemicals Ltd., Great Britain), Maprenal ® MF 900, 904 and 910 (manufactured by Hoechst AG), Cibamin ® (Ciba AG, Switzerland), Resimene ® 714, 745 and 747 (Monsanto). Hexamethoxymethylmelamine resins, such as, for example, Cymel ® 300, 301, 303, Luwipal ® 066 and Maprenal ® MF 900, are used for preference.

The urea resins (component A) used in the varnish component I are likewise known water-thinnable urea-aldehyde reaction products, preferably water-thinnable urea-formaldehyde reaction products. Examples of suitable resins are the plasticized and unplasticized urea-formaldehyde reaction products available commercially under the brand names Dynomin ® UM 15 (manufactured by Norsk Spraengstof Industrie, Norway), Resamin ® VHW 3525 (manufactured by Hoechst AG) or Plastopal ® (manufactured by BASF AG, Ludwigshafen).

The melamine and urea resins may be used as the component A either on their own or in admixture. The two-component varnish according to the invention contains the component A in an amount from 15 to 70% by weight, preferably from 30 to 55% by weight, based in each case on the total weight of the varnish component I, i.e. without the curing component II. For crosslinking the melamine and/or urea resins (component A), the aqueous coating compositions also contain 10 to 40% by weight, preferably 15 to 25% by weight, based in each case on the total weight of the varnish component I, of one or more hydroxyl-containing polyesters (component B).

According to the invention these polyesters are synthesized from
a) 33 to 55 mol % of dicarboxylic acids and
b) 67 to 45 mol % of diols and/or polyols,
the dicarboxylic acid component a being a mixture of
$a_1$) 50 to 100 mol % of at least one olefinically unsaturated aliphatic dicarboxylic acid
$a_2$) 0 to 50 mol % of at least one saturated aliphatic dicarboxylic acid and
$a_3$) 0 to 50 mol % of at least one aromatic dicarboxylic acid
and the diol and/or polyol component b being a mixture of
$b_1$) 20 to 90 mol % of at least one monomeric and/or oligomeric glycol having 2 to 4 carbon atoms per glycol segment and a number average molecular weight less than 200
$b_2$) 5 to 30 mol % of at least one polymeric glycol having 2 to 4 carbon atoms per glycol segment and a number average molecular weight between 300 and 1000 and
$b_3$) 0 to 70 mol % of at least one polyol having 2 to 4 OH groups and 4 to 10 carbon atoms per molecule, except the glycols used as the component $b_1$,
with the proviso that the total of the amounts of the components $a_1$ to $a_3$ as well as the total of the amounts of the components $b_1$ to $b_3$ as well as the total of the amounts of the components a and b are in each individual case 100 mol %.

Preferred hydroxyl-containing polyesters are obtained if the dicarboxylic acid component a consists of 100 mol % of the component $a_1$, and/or the diol and/or polyol component b consists of
$b_1$) 25 to 50 mol % of the component $b_1$,
$b_2$) 5 to 20 mol % of the component $b_2$ and
$b_3$) 45 to 70 mol % of the component $b_3$.

Further preferred polyesters B are obtained if the dicarboxylic acid component a consists of 100 mol % of the component $a_1$, and/or the diol and/or polyol component b consists of
$b_1$) 75 to 90 mol % of the component $b_1$ and
$b_2$) 10 to 25 mol % of the component $b_2$.

Finally, preferred polyesters are also obtained if the polyesters B have been prepared from
a) 43 to 48 mol % of a dicarboxylic acid and
b) 57 to 52 mol % of a diol and/or polyol.

Any olefinically unsaturated aliphatic dicarboxylic acid, such as, for example maleic acid, fumaric acid, itaconic acid and citraconic acid is suitable as the component $a_1$. Maleic acid is used for preference. These acids may be used in the form of free acids, their anhydrides—where they exist—or in the form of their derivatives capable of esterification.

Any saturated aliphatic dicarboxylic acid, such as, for example, malonic acid, succinic acid, glutaric acid, adipic acid, pimelic acid, suberic acid, azelaic acid, sebacic acid and the like, is suitable as the component $a_2$. Adipic acid, succinic acid, malonic acid and glutaric acid are used for preference. These acids may likewise be used in the form of free acids or their derivatives capable of esterification (for example anhydrides).

Any aromatic dicarboxylic acid, for example phthalic acid, isophthalic acid, terephthalic acid, naphthalenedicarboxylic acids and the like, is suitable as the component $a_3$. Aromatic dicarboxylic acids not having a substituent in the ortho position are used for preference.

Phthalic acid and isophthalic acid as well as mixtures thereof are particularly preferred. These acids may be used in the form of free acids or their derivatives capable of esterification (for example anhydrides).

Examples of suitable monomeric or oligomeric glycols having 2 to 4 carbon atoms per glycol segment and number average molecular weights $\leq 150$ (component $b_1$) are ethylene glycol, 1,2-propylene glycol, 1,3-propylene glycol, 1,3-butylene glycol, 1,4-butanediol, diethylene glycol, triethylene glycol, dipropylene glycol, tripropylene glycol, tetraethylene glycol and the like. Monomeric or oligomeric linear glycols having 2 carbon atoms per glycol segment and number average molecular weights $\leq 200$ are used for preference.

Polymeric glycols having 2 to 4 carbon atoms per glycol segment and number average molecular weights $M_n$ between 300 and 1000, such as, for example, polyethylene glycol, polypropylene glycol and polybutylene glycol as well as copolymers obtained from ethylene glycol, propylene glycol and/or tetramethylene glycol units, are suitable as the component $b_2$, polyethylene glycols being used for preference.

Various diols such as, for example, 1,6-hexanediol, neopentyl glycol, 2,2,4-trimethyl-1,3-pentanediol, 1,4-dimethylolcyclohexane as well as higher-functional alcohols, such as, for example, glycerol, pentaerythritol, trimethylolethane and trimethylolpropane, are suitable as the component $b_3$.

2,2,4-Trimethyl-1,3-pentanediol is used for preference.

These hydroxyl-containing polyesters may be prepared by the usual methods (cf. for example Houben Weyl, Methoden der organischen Chemie [Methods in Organic Chemistry], 4th edition, volume 14/2, Georg Thieme Verlag, Stuttgart 1961). They usually have hydroxyl values between 50 and 300 mg of KOH/g and generally number average molecular weights between 400 and 2000, preferably between 500 and 1000. The polyesters used are usually liquid and generally possess the lowest possible viscosity.

To obtain expedient working viscosities, both the varnish component I and the varnish component II may also contain liquid thinners. Suitable liquid thinners consist of at least 50% by weight, preferably 95 to 100% by weight, based on the total weight of all liquid thinners, of water. In addition, organic solvents, such as, for example, monohydric or polyhydric alcohols, ethers, esters and ketones, such as N-methylpyrrolidone, butanol, isopropanol, ethanol, ethyl and butyl glycol and acetates thereof, butyl diglycol, ethylene glycol dibutyl ether, ethylene glycol diethyl ether, diethylene glycol dimethyl ether, cyclohexanone, methyl ethyl ketone, acetone, isophorone, propylene glycol, or mixtures thereof, may also are present.

The amount of thinner used for the varnish component I is, in general, 0 to 20% by weight, based on the total weight of all the components of the varnish component I. The varnish component II usually contains 30 to 80% by weight of thinner, based on the total weight of the varnish component II.

The aqueous coating composition according to the invention contains as curing component (varnish component II) a water-thinnable acid, an aqueous solution thereof, or an acid blocked with amines or aminoalcohols, or an aqueous solution thereof. Suitable water-thinnable acids are phosphoric acid, maleic acid, hydrochloric acid, p-toluenesulfonic acid and derivatives thereof, naphthalenesulfonic acid and derivatives thereof as well as the corresponding reaction products of these acids with amines or aminoalcohols, such as, for example, an aqueous solution of the ammonium salts of p-toluenesulfonic acid. In the formulation of the coating compositions according to the invention as a one-component system the sulfonic acids are used in blocked form, for example as the ammonium salt.

para-Toluenesulfonic acid, hydrochloric acid and phosphoric acid are used for preference, para-toluenesulfonic acid being particularly preferred. Using solutions of para-toluenesulfonic acid in acid-stable acrylate dispersions as curing component has the advantage of improving surface properties, in particular surface tension. In order to achieve the most uniform distribution possible of this curing catalyst in the coating compositions, the acids or their derivatives are preferably used as a solution in water or a water-thinnable solvent.

The varnish components I and II are mixed prior to application in such a ratio that 0.5 to 50 parts by weight of the pure curing component II, i.e. the varnish component II without thinner, are used per 100 parts by weight of the varnish component I consisting of the components A to C (i.e. without thinner). The pot life (period during which the mixture is workable) of the resultant mixture depends, for example, on the type and concentration of the curing component and on the working temperature. To meet the requirements of the sheeting manufacturers the pot lives of the mixtures are longer than 24 hours. On the other hand, the varnish components I and II separately remain stable for more than 2 months.

The aqueous coating compositions according to the invention may also comprise the usual auxiliaries and additives in customary amounts, such as, for example, 0 to 10% by weight, preferably 0 to 3% by weight, of a matting agent (silicic acid derivatives . . . ), 0 to 2% by weight, preferably 0.5 to 1.0% by weight, of waxes (for example polyethylene and polypropylene waxes), 0 to 2.0% by weight, preferably 0.5 to 1.0% by weight, of an emulsifier (ethoxylated alkylphenols, ethoxylated fatty acids), 0 to 2.0% by weight, preferably 0.5 to 1.0% by weight, of an antifoam and 0 to 10% by weight, preferably 0 to 3% by weight, of other additives such as plasticizers (ethoxylated glycerol . . . ), thixotropic agents (polyacrylates, polyurethanes, cellulose derivatives . . . ), flow control and wetting agents (sodium salts of polyacrylates . . . ) and film-formers (phosphoric acid esters, glycols). The percentages by weight in each case refer to the total composition of the varnish component I, i.e. inclusive of any thinner which may be present.

The preparation of the varnish component I and II is carried out in the usual manner by mixing the components. It may be necessary first to dissolve a component, if it is not itself liquid, in a solvent and to mix this solution with the remaining components.

The aqueous coating composition described above may also be pigmented, in which case the varnish component I contains 0 to 40% by weight, preferably 0 to 30% by weight, in each case based on the total weight of the varnish component I, of pigment. The optimum pigment content for a particular case will depend on the desired opacity and the pigment used and can be determined by an average person skilled in the art with the aid of simple routine experiments.

To incorporate the pigments, the various pigments may either be ground together with a binder or the varnish component I is added to an aqueous pigment paste.

Any inorganic or organic pigment which is water-wettable, does not sublime at the application temperatures and does not change shade under the process and ph, conditions may be used as the pigment.

Examples of suitable pigments are titanium dioxide of the rutile type, yellow, red and black iron oxides, carbon black and phthalocyanines. Titanium dioxide is used for preference as pigment.

Furthermore, the aqueous two-component varnishes according to the invention may also contain, if necessary, added fillers, such as, for example, silicic acid, various types of talc, mica and kaolin as well as other aluminum- and/or magnesium-containing silicates, barium sulfate etc. The fillers are used in customary amounts, preferably between 3 and 7% by weight, based on the total weight of the varnish component I.

When particularly high demands are made on the quality of surface of the sheeting or on components produced therefrom, for example in the case of cupboard fronts, the coated sheeting may receive a coat of conventional varnish using customary varnishing equipment. Suitable varnishes for use for this further coat are conventional acid-curing varnishes, varnishes based on unsaturated polyester resins and varnishes based on polyurethane resins. These varnishes are known and are available commercially under various trade names.

Wood finishes based on unsaturated polyesters usually contain wax, organic solvents, styrene, unsaturated polyester resin as well as matting agents and/or other customary auxiliaries and additives in each case in customary amounts. The composition of such wood finishes is, for example, 0.2 to 1.0 parts of paraffin wax, 7.0 to 15.0 parts of styrene, 3.0 to 8.0 parts of one or more organic solvents, 55.0 to 70.0 parts of unsaturated polyester resin and 10 to 20 parts of a silicon dioxide paste and, if appropriate, other customary auxiliaries and additives.

The acid-curing varnishes usually contain, in addition to aminoplast resins and alkyd resins, organic solvents, wax and customary auxiliaries and additives in usual amounts. The composition of such acid-curing wood finishes is, for example, 15.0 to 30.0 parts of aminoplast resin, preferably urea-formaldehyde resin, 15.0 to 30.0 parts of organic solvent, 1.0 to 3.0 parts of wax, 0.5 to 5.0 parts of an alcohol component and 35.0 to 60.0 parts of a medium-oil alkyd resin.

The aqueous two-component varnishes according to the invention have the advantage that the resultant coatings (finish sheeting, continuous edging and wood materials) can receive a coat of conventional wood finish and possess very good adhesion to the further coat of varnish without any laborious pretreatments and without the addition of high proportions of plasticizers. Moreover, the resultant coatings, even when they have not received a further coat of varnish, possess good application properties such as, for example, good scratch resistance, good chemical resistance and good resistance to graying. In addition they are capable of drying with low emission.

The present invention will now be further elucidated by examples. All parts and percentages are by weight, unless expressly stated otherwise.

1. Preparation of hydroxyl-containing polyesters

The hydroxyl-containing polyesters 1 and 2 and, for comparison's sake, the polyesters C1 to C8 are prepared by conventional processes from the components listed in Table 1 by heating the individual components for 6 hours at 200° C. in a reactor fitted with a stirrer, a nitrogen inlet and a heated packed column, the resulting water of reaction being distilled off. Esterification is continued at 200° C. until the characteristic values listed in Table 2 are reached.

2. Conventional varnishes used for coating finish sheeting 2.1. Acid-curing varnish A commercial acid-curing varnish is used, based on 15.0 to 30.0 parts of an isobutanol-etherified urea-formaldehyde resin having a viscosity of 2.3 to 3.3 Pas at 23° C., 15.0 to 30.0 parts of toluene, 1.0 to 3.0 parts of wax, 0.5 to 5.0 parts of ethanol and 35.0 to 60.0 parts of a medium-oil alkyd resin based on juvandol fatty acid, phthalic anhydride, trimethylolpropane and pentaerythritol, having an acid value below 15 mg of KOH/g.

2.2 Unsaturated polyester varnish

A commercial varnish, based on an unsaturated polyester, is used with the following composition: 0.2 to 1.0 parts of paraffin wax, 7.0 to 15.0 parts of styrene, 3.0 to 8.0 parts of an organic solvent, 10.0 to 20.0 parts of silicon dioxide paste and 55.0 to 70.0 parts of an unsaturated polyester resin based on maleic anhydride, adipic acid and polypropylene glycol, having an acid value of 35 to 40 mg of KOH/g.

EXAMPLE 1

First a varnish component I-1 is prepared in the following manner:

75 parts of a commercial 86% solution of an etherified melamine-formaldehyde resin in methanol/ethanol (etherification alcohol methanol, viscosity of the resin solution 1.6–2.4 mPas at 23° C.), 1 part of a commercial emulsifier based on an ethoxylated phenol derivative, 19 parts of the polyester 1 and 5 parts of ethanol are mixed with stirring.

20 parts of an aqueous p-toluenesulfonic acid solution consisting of 30 parts of p-toluenesulfonic acid and 70 parts of water (varnish component II-1) are added with stirring to 100 parts of the varnish component I-1 prepared in this manner.

The viscosity of the sheeting topcoat obtained in this manner is adjusted to 25 seconds in a DIN 4 flow cup according to DIN 4 at 23° C. using deionized water and the coat is then applied (wet film thickness 30 μm) to a sheet of impregnated material (weight of material 85 g/m$^2$) using a wire blade; it is then dried in a circulating air oven for 30 seconds at 160° C. The sheeting obtained in this manner is then subjected to various tests of its application properties. The test results are shown in Table 3.

The resultant sheeting is furthermore pressure-applied to chipboard using a urea adhesive at a temperature of 150° C. and a pressure of 5 kp for a period of 30 seconds.

A weight of 60 g/m$^2$ (wet) of the conventional acid-curing varnish 2.1 and, in a second experiment, a weight of 100 g/m$^2$ (wet) of the conventional polyester varnish 2.2 are then applied to this laminate. After drying for 24 hours at room temperature adhesion of this conventional varnish to the sheet coating is determined by the crosshatch test. The test results are shown in Table 5.

EXAMPLE 2

A varnish component I-2 is prepared in a manner analogous to that of Example 1, except that 19 parts of the polyester 2 are used instead of 19 parts of the polyester 1. The further preparation of the sheeting topcoat 2, the application and curing are carried out in a manner analogous to that of Example 1. The test results obtained on the sheeting are likewise listed in Table 3.

The production of the sheeting/chipboard laminate and the coating thereof with an acid-curing varnish or with a varnish based on an unsaturated polyester and the testing of the laminate are as in Example 1. The results of the adhesion test are given in Table 4.

Comparison Examples 1 to 8

Various varnish components I-C1 to I-C8 are prepared in a manner analogous to that of Example 1, except that 19 parts of the polyesters C1 to C8 are used here instead of 19 parts of the polyester 1. The test for acceptance of a further coating, and the further processing of the sheeting is carried out as in Example 1. In Example C7 the testing of the application properties of the uncoated sheeting is likewise carried out as in Example 1. The corresponding test results are summarized in Tables 3 and 5.

EXAMPLE 3

First a varnish component I-3 is prepared by mixing with stirring 30 parts of a commercial water-thinnable urea-formaldehyde resin (97.5% solution in methanol; etherification alcohol=methanol, viscosity at 23° C.=2.5–3.7 mPas), 30 parts of the commercial melamine-formaldehyde resin described in Example 1, 20 parts of the polyester 1, 5 parts of dipropylene glycol monomethyl ether and 5 parts of a commercial matting agent. The resultant mixture is then mixed with 10 parts of water.

15 parts of the varnish component II-1 described in Example 1 are then added with stirring to 100 parts of the varnish component I-3 prepared in this manner. The viscosity of the sheeting topcoat 3 obtained in this manner is adjusted to 25 seconds in a DIN 4 flowcup at 23° C. using deionized water. The application and curing of the sheeting topcoat 3 obtained in this manner, the testing of the resultant sheeting and its further processing are carried out in a manner analogous to that of Example 1. The corresponding test results are listed in Tables 3 and 4.

EXAMPLE 4

First a varnish component I-4 is prepared by mixing with stirring 35 parts of a commercial methanol-etherified melamine-formaldehyde resin (100% solution, viscosity 3600–6900 mPas at 23° C.), 40 parts of the commercial water-thinnable urea-formaldehyde resin described in Example 3, 16 parts of the polyester 1 and 4 parts of a commercial matting agent. 15 parts of deionized water and 10 parts of butyl glycol are added subsequently.

10 parts of an aqueous solution obtained from 35 parts of water, 25 parts of dimethylethanolamine and 40 parts of p-toluenesulfonic acid (varnish component II-2) are added with stirring to 100 parts of the varnish component I-4 prepared in this manner. The viscosity of the resulting sheeting topcoat 4 is adjusted to 25 seconds in a DIN 4 flowcup at 23° C. using deionized water. The application and curing of the resultant sheeting topcoat 4, the testing of the resultant sheeting and the further processing thereof are carried out in a manner analogous to that of Example 1. The corresponding test results are listed in Tables 3 and 4.

EXAMPLE 5

First a varnish component I-5 is prepared by mixing with stirring 15 parts of a commercial methanol-etherified melamine-formaldehyde resin (100% solution, viscosity 3600–6900 mPas at 23° C.), 40 parts of the commercial water-thinnable urea-formaldehyde resin described in Example 3, 16 parts of the polyester 1 and 4 parts of a commercial matting agent. 15 parts of deionized water and 10 parts of butyl glycol are then added.

7.5 parts of an aqueous solution obtained from 50 parts of deionized water and 50 parts of phosphoric acid (varnish component II-3) are added with stirring to 100 parts of the varnish component I-5 prepared in this manner. The viscosity of the sheeting topcoat 5 obtained in this manner is adjusted to a viscosity of 25 seconds in a DIN 4 flowcup at 23° C. using deionized water. The application and curing of the sheeting topcoat 5 obtained in this manner, the testing of the resultant sheeting and the further processing thereof are carried out in a manner analogous to that of Example 1. The corresponding test results are listed in Tables 3 and 4.

TABLE 1

Composition of the polyesters 1 and 2 and that of C1 to C8 in moles

| | Example | | | | | | | | | |
|---|---|---|---|---|---|---|---|---|---|---|
| | 1 | 2 | C1 | C2 | C3 | C4 | C5 | C6 | C7 | C8 |
| Maleid anhydride | 1.0 | 1.0 | 1.0 | 0.5 | — | 1.0 | — | 1.0 | 1.0 | — |
| Succinic anhydride | — | — | — | — | — | — | 0.25 | — | — | 0.25 |
| Glutaric acid | — | — | — | — | — | — | 0.5 | — | — | 0.5 |
| Adipic acid | — | — | — | — | 1.0 | — | 0.25 | — | — | 0.25 |
| Phthalic anhydride | — | — | — | 0.5 | — | — | — | — | — | — |
| Diethylene glycol | — | — | 0.9 | 1.5 | — | — | — | — | 0.9 | — |
| Triethylene glycol | 1.0 | 0.25 | — | — | 1.5 | 1.5 | 1.0 | 1.5 | — | 0.25 |
| Polyethylene glycol 400[1] | 0.15 | 0.15 | — | — | — | — | — | — | — | 0.15 |
| Polyethylene glycol 1500[1] | — | — | 0.03 | — | — | — | — | — | 0.03 | — |
| TMPD glycol[2] | — | 0.75 | — | — | — | 0.5 | — | — | — | 0.75 |
| DMC[3] | — | — | — | — | — | — | 0.5 | — | — | — |
| Neopentyl glycol | — | — | — | — | — | — | — | 0.5 | — | — |
| Diallyl phthalate in % by Wt.[1] | — | — | — | — | — | — | — | — | 30 | — |

[1] based on the total weight of polyester polyol and diallyl phthalate
Notes on Table 1:
[1] polyethylene glycols 400 and 1500 are polyethylene glycols having a number average molecular weight of 400 and 1500, respectively
[2] 2,2,4-trimethyl-1,3-pentanediol
[3] 1,4-dimethylolcyclohexane

TABLE 2

Characteristic values of the polyesters 1 and 2 as well as those of C1 to C8

| | Example | | | | | | | | | |
|---|---|---|---|---|---|---|---|---|---|---|
| | 1 | 2 | C1 | C2 | C3 | C4 | C5 | C6 | C7 | C8 |
| Solids (1 h/130° C.) | >97 | >99 | >98 | >98 | >98 | 83 | 97 | 83 | 70 | 97 |
| Acid Value (mg of KOH/g) | 25 | 28 | 35 | 30 | 25 | 9 | <2 | 6 | 35 | <2 |
| OH value (mg of KOH/g)[1] | 82 | 86 | <20 | 240 | 190 | 304 | 178 | 314 | <20 | 58 |
| $M_n$[2] | 1050 | 980 | 2700 | 420 | 520 | 360 | 620 | 350 | 2700 | 1900 |
| Viscosity[3] (dpas) | 2.3[4] | 2.8[4] | — | 4.5[5] | 1.4[5] | 1.8[5] | 3.4[5] | 1.9[5] | — | 4.0[5] |
| Amount $a_1$ (mol %) | 100 | 100 | 100 | 50 | — | 100 | 25 | 100 | 100 | 25 |
| Amount $a_2$ (mol %) | — | — | — | — | 100 | — | 50 | — | — | 50 |
| Amount $a_3$ (mol %) | — | — | — | 50 | — | — | 25 | — | — | 25 |
| Amount $b_1$ (mol %) | 87 | 21.8 | 96.8 | 100 | 100 | 75 | 66.7 | 75 | 96.81 | 21.8 |
| Amount $b_2$ (mol %) | 13 | 13.0 | 3.2 | — | — | — | — | — | 3.2 | 13.0 |
| Amount $b_3$ (mol %) | — | 65.2 | — | — | — | 25 | 33.3 | 25 | — | 65.2 |

Notes on Table 2:
[1] theoretically calculated OH value assuming a glycol loss of 0% and no side reactions
[2] theoretically calculated $M_n$ assuming a glycol loss of 0% and no side reactions
[3] determined at 23° C. (using an ICI plate-cone viscometer
[4] viscosity of an 80% solution in butyl glycol at 23° C.
[5] viscosity of a 60% solution in butyl glycol at 23° C.

TABLE 3

Application properties of uncoated sheeting

| | Example | | | | | |
|---|---|---|---|---|---|---|
| | 1 | 2 | 3 | 4 | 5 | C7 |
| Gloss (60° C.) immediately after curing | 13 E | 13 E | 11 E | 7 E | 4 E | 13 E |
| Gloss (60° C.) after storage[1] | 13 E | 13 E | 11 E | 7 E | 4 E | 10 E |
| Resistance to graying[2] | 0 | 2 | 1 | 1 | 0 | 5 |
| Scratch resistance[3] | 6 DS | 4 DS | 5 DS | 5 DS | 4 DS | 1 DS |

Notes on Table 3
[1] The varnish is applied to the impregnated material (75 g/m²) using a doctor blade (30 μm) and the coating is dried in a circulating air oven for 30 seconds at 160° C.
The decorative sheeting is halved. One half is stored in polyethylene sheeting at room temperature, the other in a circulating air oven for 5 days at 45° C. Subsequently the difference in gloss between the two halves of the sheeting is assessed.
[2] Resistance to graying is tested as follows:
The varnish is applied to a dark, preferably black impregnated material (85 g/m²) at 160° C., the coating is dried in a circulating air oven for 30 seconds and is then pressure-applied to chipboard at 150° C. for 30 seconds at a pressure of 5 kp. The varnish surface is placed onto a 500 ml conical flask filled one third with water. The water is heated to boiling. After allowing the steam to act for 5 minutes the surface is taken down from the flask and the graying is assessed after a further 5 minutes (5 = distinct graying, 0 = no graying).
[3] The test for scratch resistance is carried out by applying the varnish to a dark, preferably black impregnated material (85 g/m²), drying the coating in a circulating air oven for 30 seconds at 160° C. and pressure-applying it to chipboard for 30 seconds at 150° C. under a pressure of 5 kp. Subsequently a wooden spatula is moved across the varnished surface in double strokes until the surface suffers damage. The particular number of double strokes (DS) is listed.

TABLE 4

Adhesion of conventional wood finishes to sheeting topcoat

| | Example | | | | |
|---|---|---|---|---|---|
| | 1 | 2 | 3 | 4 | 5 |
| Crosshatch[1] A-C varnish[2] | 1 | 1 | 1 | 1 | 1 |
| Crosshatch[1] UP varnish[3] | 1 | 2 | 1 | 2 | 1 |

TABLE 4-continued

Adhesion of conventional wood finishes to sheeting topcoat

| | Example | | | | |
|---|---|---|---|---|---|
| | 1 | 2 | 3 | 4 | 5 |
| UP varnish[3] | | | | | |

[1] 1 = very good adhesion; 5 = poor adhesion
[2] acid-curing wood finish
[3] wood finish based on an unsaturated polyester

TABLE 5

Adhesion of conventional wood finishes to the sheeting topcoat

| | Example | | | | | | | |
|---|---|---|---|---|---|---|---|---|
| | C1 | C2 | C3 | C4 | C5 | C6 | C7 | C8 |
| Crosshatch[1] A-C varnish[2] | 4 | 4 | 5 | 3 | 5 | 4 | 2 | 5 |
| Crosshatch[1] UP varnish[3] | 5 | 5 | 5 | 4-5 | 5 | 5 | 2 | 5 |

[1] 1 = very good adhesion; 5 = poor adhesion
[2] acid-curing wood finish
[3] wood finish based on an unsaturated polyster Summary of test results:

While good adhesion and acceptance of coating is shown by all of Examples 1 to 5, in the comparison examples good acceptance of coating is achieved only by the addition of a high proportion of diallyl phthalate as plasticizer. A high proportion of plasticizer, however, leads under the drying conditions which are customary in practice to emissions in the form of a bluish smoke.

Furthermore it follows from Tables 3 and 4 that the resultant coatings of Examples 1 to 5 have very good application properties, in particular good gloss retention, resistance to graying and good scratch resistance, so that this sheeting can be used even without any further coating and as such has good properties. On the other hand, in comparison example 7 in which the formulation comprises a high proportion of plasticizer, problems arise in respect of scratch resistance, resistance to graying and gloss retention which impose severe limits on the use in practice of such sheeting without being further coated.

We claim:
1. An aqueous coating composition for the coating of finish sheeting and continuous edging, which comprises a varnish component I Comprising

A) 15 to 70% by weight based on the total weight of the varnish component I, of one or more water thinnable melamine and/or urea resins B) 10 to 40% by weight, based on the total weight of the varnish component I, of one or more hydroxyl-containing polyesters and, C) if appropriate, pigments and/or fillers as well as, if appropriate, customary auxiliaries and additives and, D) if appropriate, thinners, comprising at least 50% by weight of water and, if appropriate, organic solvents, and a varnish component II comprising 0.5 to 50% by weight, based on the total weight of the components A to C, of an acidic curing catalyst, wherein the polyesters used as component B have been prepared from a) 33 to 55 mol % of dicarboxylic acids and b) 67 to 45 mol % of compounds selected from the group consisting of diols, polyols, and mixtures thereof, the dicarboxylic acid component a being a mixture of $a_1$) 50 to 100 mol % of at least one olefinically unsaturated aliphatic dicarboxylic acid $a_2$) 0 to 50 mol % of at least one saturated aliphatic dicarboxylic acid and $a_3$) 0 to 50 mol % of at least one aromatic dicarboxylic acid and the diol and/or polyol component b being a mixture of $b_1$) 20 to 90 mol % of at least one monomeric and/or oligomeric glycol having 2 to 4 carbon atoms per glycol segment and a number average molecular weight less than 200

$b_2$) 5 to 30 mol % of at least one polymeric glycol having 2 to 4 carbon atoms per glycol segment and a number average molecular weight between 300 and 1000 and $b_3$) 0 to 70 mol % of at least one polyol having 2 to 4 OH groups and 4 to 10 carbon atoms per molecule, except the glycols used as component $b_1$, wherein the polyol is selected from the group consisting of alkyl and cycloalkyl substituted polyols with the proviso that the total of the amounts of the components $a_1$ to $a_3$ as well as the total of the amounts of the components $b_1$ to $b_3$ as well as the total of the amounts of the components a and b are in each individual case 100 mol %.

2. An aqueous coating composition as claimed in claim 1, wherein the dicarboxylic acid component a consists of 100 mol % of the component $a_1$.

3. An aqueous coating composition as claimed in claim 1, wherein the diol and/or polyol component has $b_1$) 25 to 50 mol % of the component $b_1$, $b_2$) 5 to 20 mol % of the component $b_2$ and $b_3$) 45 to 75 mol % of the component $b_3$.

4. An aqueous coating composition as claimed in claim 1 wherein the diol and/or polyol component b has $b_1$) 75 to 90 mol % of the component $b_1$ and $b_2$) 10 to 25 mol % of the component $b_2$.

5. An aqueous coating composition as claimed in claim 1 wherein the polyesters used as component B have been prepared from a) 43 to 48 mol % of dicarboxylic acid and b) 57 to 52 mol % of diol and/or polyol.

6. An aqueous coating composition as claimed in claim 1 wherein methanol-etherified melamine-formaldehyde resins and/or methanol-etherified urea resins are used as component A.

7. A process for coating finish sheeting and endless edging, comprising

I) an aqueous coating composition, containing a varnish component I and a varnish component II which are mixed preferably immediately prior to application, being applied, II) the resultant wet film being baked in for 8 to 50 seconds at a temperature of between 90° and 200° C., III) if desired, the resultant coating being further coated with another varnish, the varnish component I comprising A) 15 to 70% by weight, preferably 30 to 55% by weight, based on the total weight of the vanish component I, of one or more water-thinnable melamine and/or urea resins B) 10 to 40% by weight, preferably 15 to 25% by weight, based on the total weight of the varnish component I, of one or more hydroxyl-containing polyesters and, C) if appropriate, pigments and/or fillers as well as, if appropriate, customary auxiliaries and additives and, D) if appropriate, thinners, comprising at least 50% by weight of water and, if appropriate, organic solvents, and a varnish component II containing 0.5 to 50% by weight, based on the total weight of the components A to C, of an acidic curing catalyst, wherein the polyesters used as the component B have been prepared from a) 33 to 55 mol % of dicarboxylic acids and b) 67 to 45 mol % of diols and/or polyols, the dicarboxylic acid component a being a mixture of $a_1$) 50 to 100 mol % of at least one olefinically unsaturated aliphatic dicarboxylic acid $a_2$) 0 to 50 mol % of at least one saturated aliphatic dicarboxylic acid and $a_3$) 0 to 50 mol % of at least one aromatic dicarboxylic acid and the diol and/or polyol component b being a mixture of $b_1$) 20 to 90 mol % of at least one monomeric and/or oligomeric glycol having 2 to 4 carbon atoms per glycol segment and a number average molecular weight less than 200

$b_2$) 5 to 30 mol % of at least one polymeric glycol having 2 to 4 carbon atoms per glycol segment and a number average molecular weight between 300 and 1000 and $b_3$) 0 to 70 mol % of at least one polyol having 2 to 4 OH groups and 4 to 10 carbon atoms per molecule, except the glycols used as component $b_1$, wherein the polyol is selected from the group consisting of alkyl and cycloalkyl substituted polyols with the proviso that the total of the amounts of the components $a_1$ to $a_3$ as well as the total of the amounts of the components $b_1$ to $b_3$ as well as the total of the amounts of the components a and b are in each individual case 100 mol %.

8. The process as claimed in claim 7, wherein the dicarboxylic acid component a consists of 100 mol % of the component $a_1$.

9. The process as claimed in claim 7 wherein the diol and/or polyol component b has $b_1$) 25 to 50 mol % of the component $b_1$, $b_2$) 5 to 20 mol % of the component $b_2$ and $b_3$) 45 to 70 mol % of the component $b_3$.

10. The process as claimed in claim 7 wherein the dicarboxylic acid component a consists of 100 mol % of the component $a_1$ and the diol and/or polyol component b has $b_1$) 75 to 90 mol % of the component $b_1$ and
$b_2$) 10 to 25 mol % of the component $b_2$.

11. The process as claimed in claim 7 wherein the polyesters used as component B have been prepared from a) 43 to 48 mol % of a dicarboxylic acid and
b) 57 to 52 mol % of a diol and/or a polyol.

12. The process as claimed in claim 7 wherein methanol-etherified melamine-formaldehyde resins and/or methanol-etherified urea resins are used as component A.

13. A finish sheeting or continuous edging which has been coated by the process as claimed in claim 7.

* * * * *

UNITED STATES PATENT AND TRADEMARK OFFICE
CERTIFICATE OF CORRECTION

PATENT NO. : 5,374,691
DATED : December 20, 1994
INVENTOR(S) : Hintze Brüning et al It is certified that error appears in the above-indentified patent and that said Letters Patent is hereby corrected as shown below:

On the title page: Item [73] Assignee: BASF Lacke + Farben Aktiengesellschaft, Munster, Germany should be deleted.

Signed and Sealed this

Nineteenth Day of December, 1995

Attest:

BRUCE LEHMAN

Attesting Officer

Commissioner of Patents and Trademarks